(12) United States Patent
Lee et al.

(10) Patent No.: US 10,312,022 B2
(45) Date of Patent: Jun. 4, 2019

(54) CAPACITOR AND METHOD OF MANUFACTURING THE SAME

(71) Applicant: SAMSUNG ELECTRO-MECHANICS CO., LTD., Suwon-si, Gyeonggi-do (KR)

(72) Inventors: Sang Moon Lee, Suwon-si (KR); Myung Jun Park, Suwon-si (KR); Hye Jin Jeong, Suwon-si (KR); Chung Yeol Lee, Suwon-si (KR); Young Sook Lee, Suwon-si (KR); Jae Yeol Choi, Suwon-si (KR); Hye Young Choi, Suwon-si (KR); Byoung Jin Chun, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/298,619

(22) Filed: Oct. 20, 2016

(65) Prior Publication Data

US 2017/0154729 A1  Jun. 1, 2017

(30) Foreign Application Priority Data

Nov. 26, 2015  (KR) .................. 10-2015-0166309

(51) Int. Cl.
| | |
|---|---|
| *H01G 4/232* | (2006.01) |
| *H01G 4/30* | (2006.01) |
| *H01G 13/00* | (2013.01) |
| *H01G 4/012* | (2006.01) |
| *H01G 4/12* | (2006.01) |

(52) U.S. Cl.
CPC .......... *H01G 4/232* (2013.01); *H01G 4/2325* (2013.01); *H01G 4/30* (2013.01); *H01G 13/006* (2013.01); *H01G 4/012* (2013.01); *H01G 4/12* (2013.01)

(58) Field of Classification Search
CPC ....... H01G 4/232; H01G 4/228; H01G 4/2325
See application file for complete search history.

(56) References Cited

U.S. PATENT DOCUMENTS

| | | | | |
|---|---|---|---|---|
| 4,977,485 | A * | 12/1990 | Mori ....................... | B32B 18/00 361/321.4 |
| 6,381,117 | B1 * | 4/2002 | Nakagawa ............... | H01G 2/14 361/301.4 |

(Continued)

FOREIGN PATENT DOCUMENTS

| | | | | |
|---|---|---|---|---|
| JP | 11162771 A | * | 6/1999 | .......... H01G 4/2325 |
| JP | 2003-197460 A | | 7/2003 | |

*Primary Examiner* — Eric W Thomas
(74) *Attorney, Agent, or Firm* — Morgan Lewis & Bockius LLP

(57) ABSTRACT

A capacitor includes a capacitor body having upper and lower surfaces and end surfaces connecting the upper and lower surfaces; and an external electrode disposed on a surface of the capacitor body and having a first electrode layer, a second electrode layer, and a third electrode layer. The second electrode layer includes metal and resin and is interposed between the first electrode layer and the third electrode layer, and a portion of the second electrode layer covering the end surface of the capacitor body has a thickness less than that of a portion of the first electrode layer covering the end surface of the capacitor body.

13 Claims, 5 Drawing Sheets

(56) References Cited

U.S. PATENT DOCUMENTS

| | | | | |
|---|---|---|---|---|
| 6,388,864 B1* | 5/2002 | Nakagawa | ............... | H01G 2/14 361/306.3 |
| 8,102,641 B2* | 1/2012 | Koga | .................... | H01G 4/228 29/25.42 |
| 2009/0002920 A1* | 1/2009 | Itamura | ................. | H01G 4/232 361/321.3 |
| 2013/0170095 A1* | 7/2013 | Oh | ......................... | H01G 4/008 361/305 |
| 2014/0192453 A1* | 7/2014 | Hong | .................... | H01G 4/008 361/301.4 |

* cited by examiner # CAPACITOR AND METHOD OF MANUFACTURING THE SAME

CROSS-REFERENCE TO RELATED APPLICATION

This application claims the benefit of priority to Korean Patent Application No. 10-2015-0166309, filed on Nov. 26, 2015 with the Korean Intellectual Property Office, the entirety of which is incorporated herein by reference.

BACKGROUND

The present disclosure relates to a capacitor and a method of manufacturing the same.

An external electrode of a capacitor may be changed from a sintered-type electrode formed using a metal paste to a hardened-type electrode using a conductive resin composition that is a metal-resin composite.

A conductive resin layer formed of the conductive resin composition may include metal and a hardening resin for implementing conductivity, and thus may absorb external impacts that may be applied to the capacitor to reduce stress that may occur in the capacitor, thereby preventing cracks from occurring in the capacitor body and improving reliability against the permeation of a plating solution thereinto.

When the resin of the conductive resin layer is exposed to an external electrode as it is, however, equivalent series resistance (ESR) may be increased due to a degradation in the conductivity of the external electrode. In the case that the conductive resin layer includes an excessive amount of resin, non-plating may occur and a lifting phenomenon in which the capacitor and the external electrode are separated from each other may occur.

In particular, termination, dielectric constant, electroplating, and the like may be factors affecting ESR within a capacitor. The conductive resin layer may contribute to higher ESR levels because of both interface and termination resistance.

In detail, a specific level of resistance may be increased due to the use of the conductive resin layer. Furthermore, ESR may be increased due to the interface between a metal layer formed of metal and the conductive resin layer, as well as interface between the conductive resin layer and a metal plating layer.

Therefore, there is increased demand for an external electrode including a conductive resin layer but having reduced ESR occurring due to the conductive resin layer.

The external electrode including the conductive resin layer may have increased specific resistance and the ESR of the capacitor may be increased due to the increase in the interface resistance between the plating layer and the conductive layer.

SUMMARY

An aspect of the present disclosure allows a thickness of a conductive resin layer to be reduced to allow a resistance of an external electrode to be reduced, to thereby reduce the equivalent series resistance (ESR) of a capacitor.

According to an aspect of the present disclosure, a capacitor includes a second electrode layer including metal and resin that is interposed between a first electrode layer and a third electrode layer, and a portion of the second electrode layer covering an end surface of a capacitor body may have a thickness less than that of a portion of the first electrode layer covering the end surface of the capacitor body to reduce ESR of the capacitor while preventing cracks from occurring due to external impacts, to thereby improve electrical characteristics of the capacitor.

According to another aspect of the present disclosure, a manufacturing method of a capacitor comprises the steps of: forming a first electrode layer by applying a first conductive paste on a surface of a capacitor body having upper and lower surfaces and end surfaces connecting the upper and lower surfaces; forming a second electrode layer by applying a conductive resin composition on a surface of the first electrode layer; machining a portion of the second electrode layer covering the end surface of the capacitor body; and forming a third electrode layer on a surface of the second electrode layer. The second electrode layer is formed to make the portion covering the end surface of the capacitor body thinner than the portion of the first electrode layer covering the end surface of the capacitor body.

According to another aspect of the present disclosure, a multilayer ceramic capacitor, comprises: a body including a plurality of dielectric layers and internal electrodes which are alternately stacked, the body having upper and lower surfaces, end surfaces, and side surfaces, and an external electrode including a first electrode layer, a second electrode layer, and a third electrode layer. The second electrode layer includes a resin and a metal, the second layer is interposed between the first layer and the third layer, a thickness of portions of the second layer covering the end surfaces is smaller than a thickness of portions of the second layer covering the upper and lower surfaces, and a thickness of portions of the first layer covering the end surfaces is greater than a thickness of the portions of the second layer covering the upper and lower surfaces.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
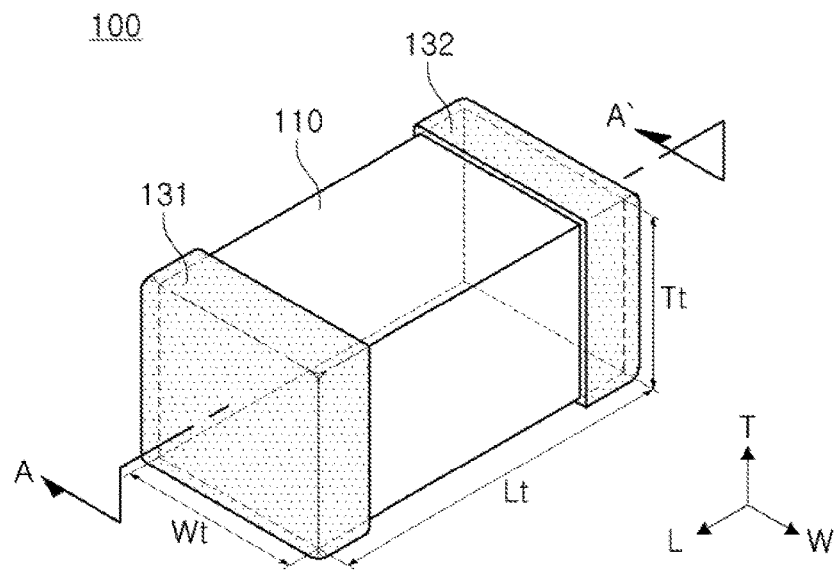
FIG. 1 is a perspective view schematically illustrating a capacitor according to an exemplary embodiment in the present disclosure.

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship relative to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

Hereinafter, a capacitor according to the present disclosure will be described.

Figure 2:
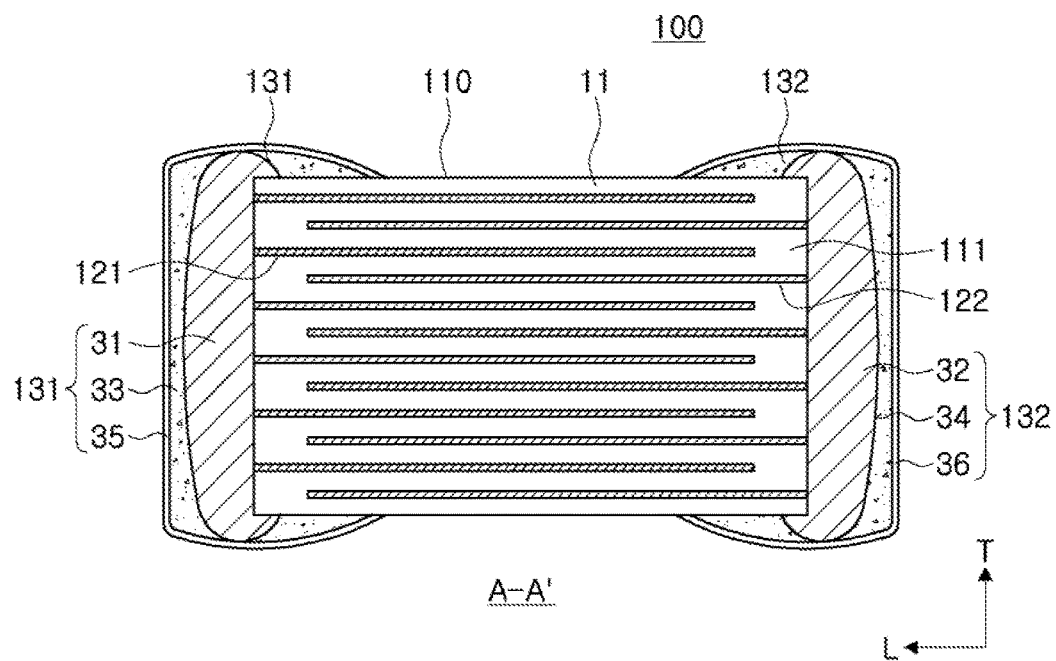
FIGS. 2 and 3 are cross-sectional views schematically illustrating the capacitor according to an exemplary embodiment in the present disclosure.
Figure 3:
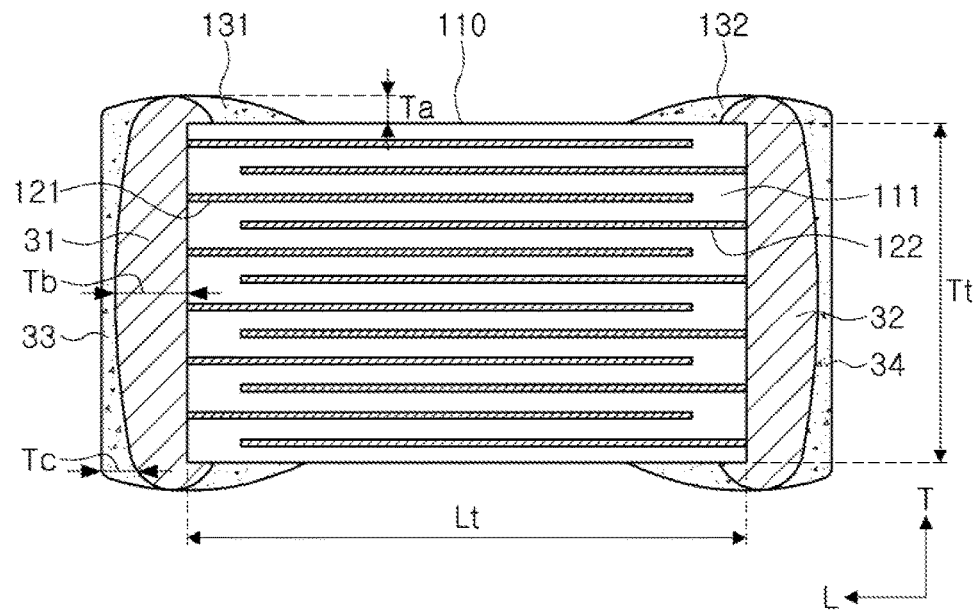

FIG. 1 is a perspective view schematically illustrating a capacitor according to an exemplary embodiment in the present disclosure, and FIGS. 2 and 3 are cross-sectional views schematically illustrating the capacitor according to an exemplary embodiment in the present disclosure.

Referring to FIGS. 1 through 3, a capacitor according to an exemplary embodiment in the present disclosure may include a capacitor body 110 having upper and lower surfaces and end surfaces connecting the upper and lower surfaces of the capacitor body 110 and external electrodes 131 and 132 disposed on a surface of the capacitor body 110. The external electrodes 131 and 132 may each have a first electrode layer, a second electrode layer, and a third electrode layer. The second electrode layers 33 and 34 may include metal and resin and may be interposed between the first electrode layer and the third electrode layer, and a portion of the second electrode layer covering the end surface of the capacitor body may have a thickness less than that of a portion of the first electrode layer covering the end surface of the capacitor body.

The capacitor body 110 may be formed by stacking a plurality of dielectric layers 111.

The plurality of dielectric layers 111 forming the capacitor body 110 may be in a sintered state, and adjacent dielectric layers may be integrated with each other so that boundaries therebetween may not be readily confirmed with the naked eye.

The dielectric layer 111 may be formed by sintering a ceramic green sheet including a ceramic powder, an organic solvent, and an organic binder. The ceramic powder may include a perovskite material as a material having high permittivity. The perovskite material is not limited thereto but may be a barium titanate ($BaTiO_3$) based material, a strontium titanate ($SrTiO_3$) based material, or the like.

An interior of the capacitor may be provided with internal electrodes 121 and 122.

The internal electrodes 121 and 122 may include first internal electrodes 121 having a first polarity and second internal electrodes 122 having a second polarity and may be disposed to face each other, having one dielectric layer disposed therebetween.

The internal electrodes 121 and 122 may be exposed to first and second ends of the capacitor in the length direction, respectively, to be electrically connected to the external electrodes 131 and 132, respectively.

The internal electrodes 121 and 122 may be formed by a conductive paste including metal.

The metal may be nickel (Ni), copper (Cu), palladium (Pd), or an alloy thereof but is not limited thereto.

The internal electrodes 121 and 122 may be printed on a ceramic green sheet forming the dielectric layer using the conductive paste by printing methods such as a screen printing method and a gravure printing method.

The ceramic green sheets having the internal electrodes 121 and 122 printed thereon may be alternately stacked and fired to form the ceramic body 110.

The external electrodes may include a first external electrode 131 formed on a first end surface of the capacitor body 110 in the length direction to be electrically connected to the first internal electrode 121 exposed to the first end surface of the capacitor body 110 in the length direction and a second external electrode 132 formed on the second end surface thereof in the length direction to be electrically connected to the second internal electrode 122 exposed to the second end surface thereof in the length direction.

The external electrodes 131 and 132 are each formed on the end surfaces of the capacitor body 110 in the length direction to be connected to the first and second internal electrodes 131 and 132.

Furthermore, the external electrodes 131 and 132 may be extended to the upper and lower surfaces and both side surfaces of the capacitor body 110.

Therefore, the external electrodes 131 and 132 may be formed to enclose both end surfaces and portions of the upper and lower surfaces and the side surfaces of the capacitor body 110 while being connected to the internal electrodes exposed to the first and second end surfaces of the capacitor body 110 in the length direction.

The external electrodes 131 and 132 may include first electrode layers 31 and 32, second electrode layers 33 and 34 formed on surfaces of the first electrode layers 31 and 32, and third electrode layers 35 and 36 formed on surfaces of the second electrode layers 33 and 34.

The first electrode layers 31 and 32 are a metal layer and may be formed by the conductive paste including metal.

The metal may be nickel (Ni), copper (Cu), tin (Sn), or an alloy thereof but is not limited thereto.

The conductive paste may further include an insulating material. For example, the insulating material may be glass.

The second electrode layers 33 and 34 may be the conductive resin layer and may be formed of a conductive resin composition including metal and resin.

The metal may be nickel (Ni), copper (Cu), tin (Sn), or an alloy thereof but may be the same material as the metal of the first electrode layer.

The resin may be one selected from an epoxy resin, a phenol resin, and a polyimide resin as a thermosetting resin or may be the epoxy resin but is not limited thereto.

The thermosetting resin may maintain heat resistance, chemical resistance, or the like and absorb the external impact and the metal may make an electrical connection possible.

According to a manufacturing method, in the second electrode layers 33 and 34, the portions disposed on the upper and lower surfaces may have a curved surface and the portion disposed on the end surfaces may have a flat surface.

The third electrode layers 35 and 36 which are a metal plating layer may be formed by the plating of metal.

The metal may be nickel (Ni), tin (Sn), or an alloy thereof.

The third electrode layers 35 and 36 may include tin (Sn) to be bonded to a solder when the capacitor is mounted on a mounting substrate.

In general, the conductive resin layer of the external electrode may serve to absorb an external impact applied to the capacitor and prevent cracks from occurring in the capacitor body. However, a specific resistance of the external electrode may be increased due to the presence of the conductive resin layer, and due to an interface resistance between the conductive resin layer and the metal layer, as well as an interface resistance between the conductive resin layer and the metal plating layer. As a result, equivalent series resistance (ESR) of the capacitor may be increased, and therefore desirable electrical characteristics of the capacitor may be deteriorated.

The external electrodes 131 and 132 of the capacitor according to the exemplary embodiment in the present disclosure may be formed to make a thickness of portions of the second electrode layers 33 and 34 covering the end surfaces of the capacitor body smaller than that of portions of the first electrode layers 31 and 32 covering the end surfaces of the capacitor body.

In the above-mentioned structure, the thickness of the second electrode layer may be reduced and thus a resistance of the portion covering the side surfaces of the capacitor body in the first electrode layers may be reduced, such that the ESR of the capacitor may be reduced and the occurrence of defects such as the occurrence of cracks and the permeation of a plating solution may be reduced.

Referring to FIG. 2, some portions of the first electrode layers 31 and 32 may contact the third electrode layers 35 and 36.

That is, the third electrode layers 35 and 36 may be formed to contact some of the surfaces of the first electrode layers 31 and 32 in addition to the surfaces of the second electrode layers 33 and 34.

The portions of the first electrode layers 31 and 32 contacting third electrode layers 35 and 36 may be corner portions of the first electrode layers 31 and 32.

If a portion of the first electrode layer contacts the third electrode layer, defects due to the surface oxidation of the first electrode layer may be prevented to make the strength of the external electrode excellent, and the first and third electrode layers having large conductivity may contact each other, to thereby obtain a capacitor having excellent conduction reliability.

A thickness Tb of the portions of the first electrode layers 31 and 32 covering the end surfaces of the capacitor body may be at least twice as thick as a thickness Ta of the portions of the second electrode layer covering the upper and lower surfaces of the capacitor body 33 and 34. As a result, the ESR of the capacitor may be reduced.

A thickness Tc of the portions of the second electrode layers 33 and 34 covering the end surfaces of the capacitor body may be less than the thickness Tb of the portions of the first electrode layers 31 and 32 covering the end surfaces of the capacitor body.

The thickness Ta may be a thickness of the thickest area in the portions covering the upper and lower surfaces of the second electrode layers.

If Tb is more than twice the value of Ta, the ESR of the capacitor may be increased to 20 mohm or more, thereby reducing the reliability of the capacitor.

The second electrode layers 33 and 34 may be formed to make the thickness of the portion covering the end surfaces of the capacitor body smaller than that of the portions covering the upper and lower surfaces of the capacitor body. The thickness of the portions of the second electrode layers 33 and 34 covering the end surfaces may be reduced to reduce the ESR of the capacitor and prevent the permeation of the plating solution, to thereby improve the reliability of the capacitor.

If the thickness of the portions of the second electrode layer covering the upper and lower surfaces of the capacitor body 33 and 34 is Ta, the thickness of the portions of the first electrode layers 31 and 32 covering the end surfaces of the capacitor body is Tb, the whole length of the capacitor body 110 is Lt, and the whole width of the capacitor body 110 is Wt, Lt≥Wt, Lt/500≤Ta≤Lt/50 may be satisfied.

If Lt/500≥Ta, the moisture proof reliability of the capacitor may not be secured and if Ta≥Lt/50, the capacitor may be out of the width size of the capacitor and thus it may be difficult to secure capacity of the capacitor compared to the size of the capacitor.

The thickness Tb of the portion of the first electrode layer covering the side surfaces may satisfy Lt/250≤Tb≤Lt/25.

If Lt/250≥Tb, the moisture proof reliability of the capacitor may not be secured and if Tb≥Lt/25, the capacitor may be out of the length size of the capacitor and thus the reliability of warpage strength may be reduced.

Figure 4:
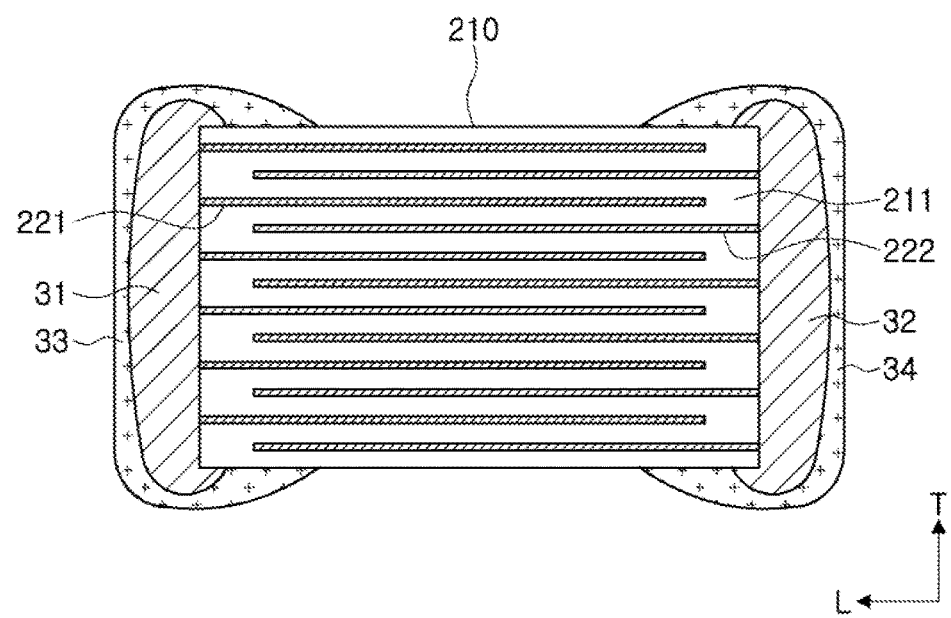
FIGS. 4 through 6 are cross-sectional views schematically illustrating a capacitor according to additional exemplary embodiments in the present disclosure.
Figure 5:
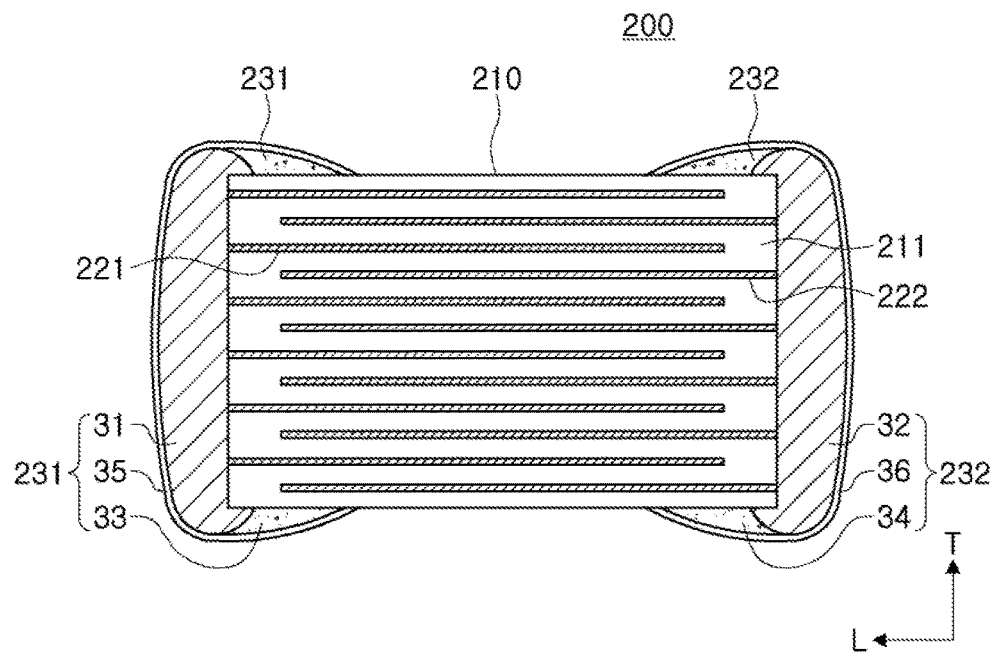
Figure 6:
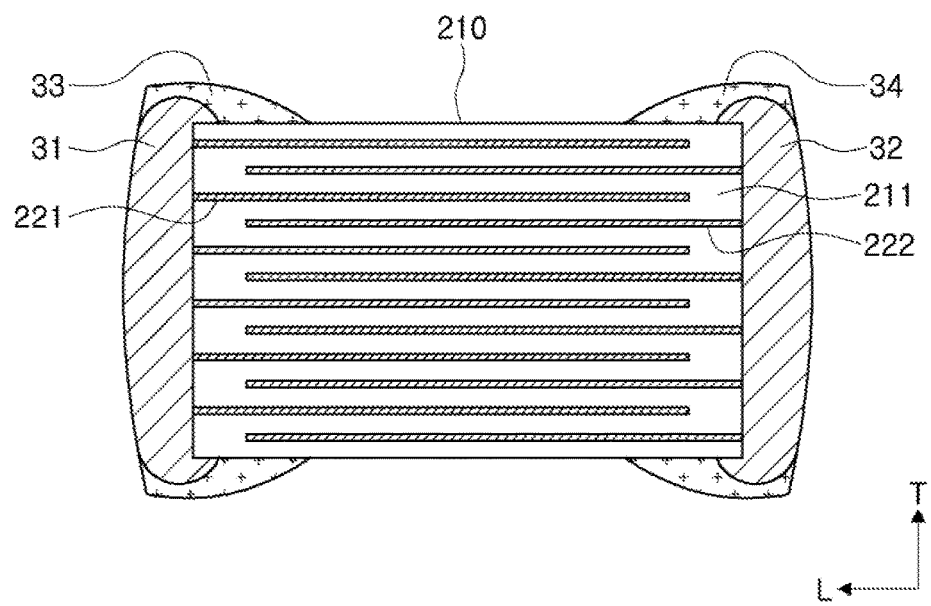

FIGS. 4 through 6 are side views schematically illustrating a capacitor according to additional exemplary embodiments in the present disclosure.

A description of the same components as components shown in FIGS. 1 through 3 among the components shown in FIGS. 4 through 6 will be omitted.

In the capacitor according to the exemplary embodiment in the present disclosure shown in FIG. 4, the second electrode layers 33 and 34 may be formed along the surfaces of the first electrode layers 31 and 32 to secure the reliability against the permeation of the plating solution. Due to the structure, the first electrode layer may not have an area contacting the third electrode layer that is the plating layer.

Referring to FIGS. 5 and 6, in the capacitor 200 according to another exemplary embodiment in the present disclosure, when the thickness of the portions of the second electrode layers 33 and 34 covering the end surfaces of the capacitor body is Tc, Tc=0.

That is, the second electrode layers 33 and 34 may be formed only on the upper and lower surfaces of the capacitor body and both side surfaces connected to the upper and lower surfaces and may have a band shape. As a result, the permeation of the plating solution of the capacitor may be prevented.

Due to the structure, the first electrode layers 31 and 32 may contact the third electrode layers 35 and 36 and the side surfaces of the capacitor body. The exposed area of the first electrode layer may be increased before the formation of the plating layer, and as a result the plating characteristics may be improved and the resistance at the side surfaces of the capacitor body may be reduced, and as a result the ESR of the capacitor may be reduced.

Figure 7:
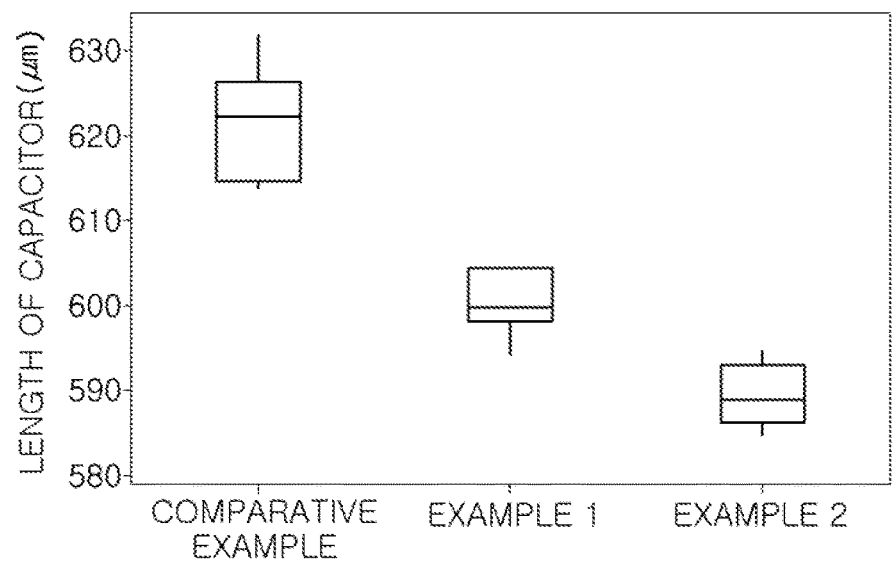
FIG. 7 is a graph illustrating a length of the capacitor according to comparative and exemplary embodiments in the present disclosure.
Figure 8:
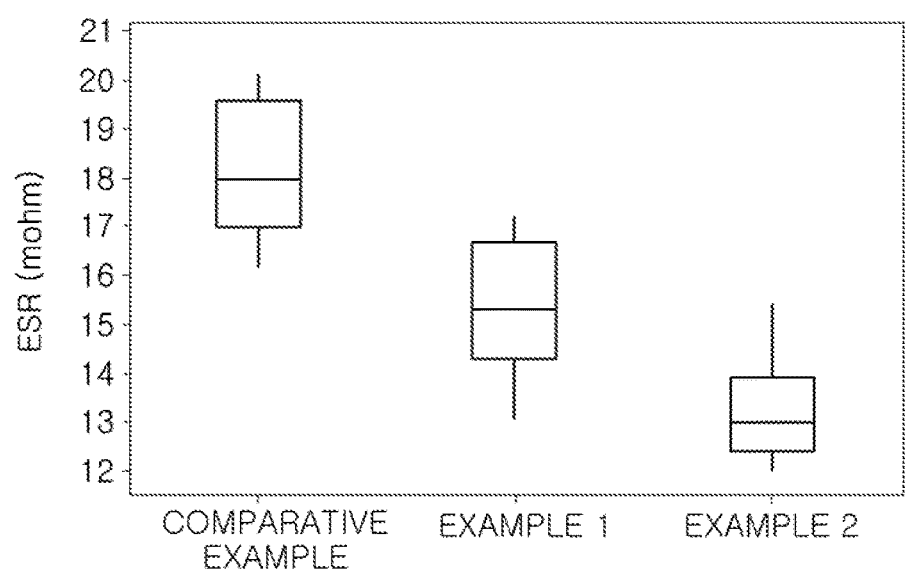
FIG. 8 is a graph illustrating an equivalent series resistance (ESR) value according to comparative and exemplary embodiments in the present disclosure.

FIG. 7 is a graph illustrating a length of the capacitor according to a Comparative Example and Exemplary Embodiments in the present disclosure and FIG. 8 is a graph illustrating an ESR value according to a Comparative Example and Exemplary Embodiments in the present disclosure.

The Comparative Example is the existing capacitor in which the thickness of the second electrode layer is not reduced and the Examples are the capacitor in which the second electrode layer is formed to make the area covering the side surfaces of the capacitor body thinner than the portions of the second electrode layer covering the upper and lower surfaces of the capacitor body. Example 1 has a structure in which the portion covering the end surfaces of the second electrode layer is present, and Example 2 has a structure in which the second electrode layer does not have the portion covering the end surfaces, and is present only on the upper and lower surfaces of the capacitor and both side surfaces connected to the upper and lower surfaces thereof.

Referring to FIGS. 7 and 8, the above Examples show that the length of the capacitor and the ESR are more reduced, compared to Comparative Example. In particular, in the above Examples, Example 2 having the structure in which the portion covering the end surfaces of the second electrode layer is not present shows that the ESR is reduced. This demonstrates that the smaller the thickness of the portion covering the end surfaces of the second electrode layer, the smaller the ESR becomes.

Hereinafter, a manufacturing method of a capacitor according to the present disclosure will be described.

The manufacturing method of a capacitor according to an exemplary embodiment in the present disclosure may include forming the first electrode layer by applying the first conductive paste on the surface of the capacitor body having the upper and lower surfaces and the side surfaces connecting the upper and lower surfaces, forming the second electrode layer by applying the conductive resin composition on the surface of the first electrode layer, machining the portion covering the side surfaces of the capacitor body in the second electrode layer, and forming the third electrode layer on the surface of the second electrode layer, in which the second electrode layer may be formed to make the portion covering the end surfaces of the capacitor body smaller than the portion of the first electrode layer covering the end surfaces of the capacitor body.

The capacitor body may be formed by stacking the plurality of dielectric layers applied with the paste of the internal electrode in an upper portion thereof to form the external electrode and performing the firing method on the stacked dielectric layer.

The first electrode layer and the second electrode layer may be formed by a dipping scheme.

The first electrode layer may be more thickly applied than before but is not limited thereto.

The first conductive paste may include metal and the conductive resin composition may include metal and resin.

The metal may be nickel (Ni), copper (Cu), palladium (Pd), or an alloy thereof but is not limited thereto.

The resin may be one selected from an epoxy resin, a phenol resin, and a polyimide resin as a thermosetting resin or may be the epoxy resin but is not limited thereto.

FIGS. 9A through 9D are diagrams schematically illustrating a manufacturing method of a capacitor according to an exemplary embodiment in the present disclosure.

Referring to FIGS. 9A through 9D, the plurality of capacitors 100 in which the first and second electrode layers are formed may be fixed to a fixing jig 320 while being bonded to a fastening tape 310, such that the plurality of capacitors 100 may be finally fixed to a loading plate 300.

In the plurality of capacitors 100, one end portion formed with the first and second electrode layers may be the fixed area and the other end portion may be the machined area.

The side surfaces of the plurality of fixed capacitors 100 may be machined by a machine 400.

The machine 400 may be a machine that may perform mechanical machining methods such as grinding, lapping, polishing, and buffing.

In the machining of the second electrode layer, the thickness of the portion of the second electrode layer covering the end surfaces of the capacitor body may be partially removed. In this case, the thickness of the portion of the second electrode layer covering the end surfaces may be smaller than that of the portion of the first electrode layer covering the end surfaces. The thickness of the portion of the second electrode layer covering the end surfaces may be reduced to reduce the ESR of the capacitor, to thereby prevent the cracks from occurring.

In the second electrode layer, by the manufacturing process, the portions disposed on the upper and lower surfaces may have a curved surface and the portion disposed on the end surfaces may have a flat surface.

Further, in the machining of the second electrode layer, the portion of the second electrode layer covering the end surfaces of the capacitor body may be removed to expose the portion of the first electrode layer covering the end surfaces.

That is, the second electrode layer may be formed only on the upper and lower surfaces and both side surfaces of the capacitor body to prevent the plating solution from being permeated into the capacitor body.

The thickness of the portion of the first electrode layer covering the end surfaces of the capacitor body may be at least twice as thick as that of the portions of the second electrode layer covering the upper and lower surfaces of the capacitor body.

As a result, the resistance of the external electrode may be reduced and therefore the ESR of the capacitor may be reduced. Next, upon the formation of the plating layer, the non-plating may be reduced and the interface resistance with the plating layer may be reduced.

The machine 400 may be a lapping plate or a wheel.

The lapping method is a method of disposing a polishing material on an upper portion of the lapping plate, disposing a product to be machined on an upper portion of the polishing material, and applying a weight to an upper portion of the product to polish a polishing surface by a friction force between the product and the polishing material.

The thickness and roughness of the surface of the product may be adjusted by a particle size of the polishing material and a rolling speed.

In the machining of the second electrode layer, when the lapping method is performed, only the portion covering the end surfaces may be selectively machined without damage to the first electrode layers at an edge and the end surfaces. Further, the effect of exposing metal to the end surfaces of the second electrode layer may be expected.

The grinding method is a method of performing polishing by the friction force between a grinding wheel and the product.

When the grinding method is performed, the accuracy of the thickness and the surface characteristics may be determined based on a rotational speed of the grinding wheel.

Figure 9A:
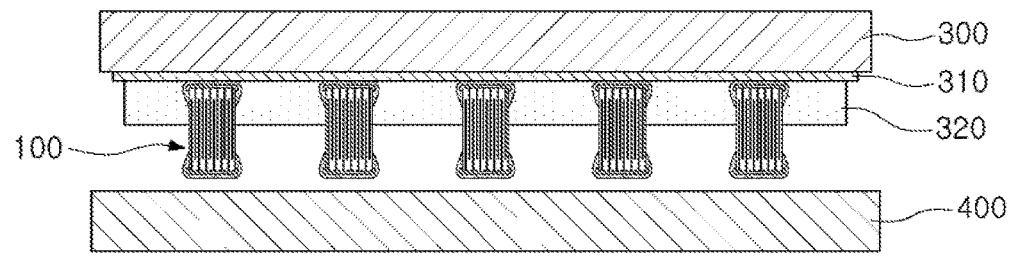
FIGS. 9A through 9D are diagrams schematically illustrating a manufacturing method of a capacitor according to an exemplary embodiment in the present disclosure.
Figure 9B:
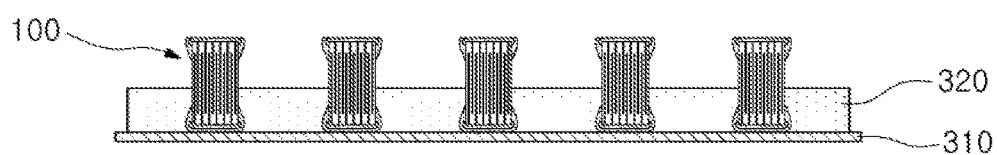

By the method, a portion of the second electrode layer on the other end surface of the capacitor 100 may be removed as shown in FIG. 9B.

Figure 9C:
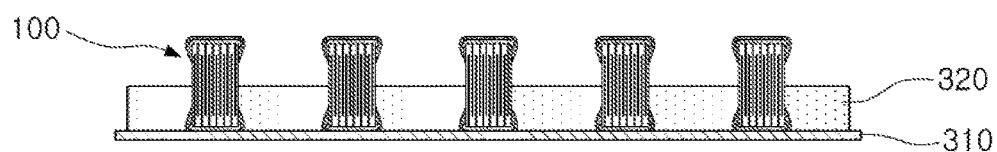
Figure 9D:
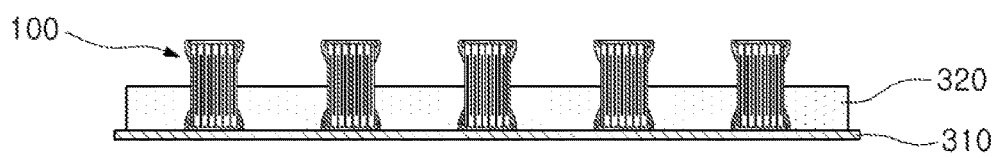

Next, referring to FIGS. 9C and 9D, the machined surface of the second electrode layer may be the fixed area and one end portion of the capacitor 100 may be the machined area, such that the capacitor in which both end surfaces of the second electrode layer of the capacitor are machined may be obtained.

After the machining, the third electrode layer may be formed on the surface of the second electrode layer by the plating of metal.

The metal may be nickel (Ni), tin (Sn), or an alloy thereof.

When some of the portion of the first electrode layer covering the side surfaces of the capacitor body is exposed, some of the exposed portion may be formed with the third electrode layer.

When the portion of the second electrode layer covering the end surfaces is completely removed, the first electrode layer is exposed to the portion covering the end surfaces of the capacitor and therefore the third electrode layer may be formed on some of the surface of the first electrode layer and the surface of the second electrode layer. The exposed area of the first electrode layer may be increased before the formation of the plating layer, and as a result the plating characteristics may be improved and the resistance at the portion covering the end surfaces of the capacitor body may be reduced, and as a result the ESR of the capacitor may be reduced.

As set forth above, the capacitor according to the exemplary embodiment in the present disclosure may reduce the thickness of the conductive resin layer of the external electrode to reduce the ESR of the capacitor while preventing the cracks from occurring due to the external impact.

While exemplary embodiments have been shown and described above, it will be apparent to those skilled in the art that modifications and variations could be made without departing from the spirit and scope of the present disclosure as defined by the appended claims.

What is claimed is:

1. A capacitor, comprising:
   a capacitor body having upper and lower surfaces, and side surfaces connecting the upper and lower surfaces, the side surfaces including end surfaces and first and second side surfaces; and
   an external electrode disposed on a surface of the capacitor body and having a first electrode layer, a second electrode layer, and a third electrode layer,
   wherein the second electrode layer includes metal and resin and is interposed between the first electrode layer and the third electrode layer,
   a portion of the second electrode layer covering one of the side surfaces of the capacitor body has a thickness less than that of a portion of the first electrode layer covering a corresponding side surface of the capacitor body,
   an entirety of the first electrode layer directly contacts the upper, lower and side surfaces of the capacitor body, and
   a portion of the first electrode layer covering one of the side surfaces of the capacitor body directly contacts the third electrode layer covering the corresponding side surface.

2. The capacitor of claim 1, wherein a portion of the second electrode layer covering the side surface of the capacitor body contacts the third electrode layer.

3. The capacitor of claim 1, wherein the second electrode layer is only disposed on the upper and lower surfaces and the first and second side surfaces of the capacitor body.

4. The capacitor of claim 1, wherein the third electrode layer is formed on a portion of the surface of the first electrode layer and a surface of the second electrode layer.

5. The capacitor of claim 1, wherein a thickness of the portion of the first electrode layer covering the end surface of the capacitor body is at least twice as thick as that of portions of the second electrode layer covering the upper and lower surfaces of the capacitor body.

6. The capacitor of claim 1, wherein the portion of the second electrode layer covering the end surface of the capacitor body is thinner than portions of the second electrode layer covering the upper and lower surfaces of the capacitor body.

7. The capacitor of claim 1, wherein in the portions of the second electrode layer disposed on the upper and lower surfaces have a curved surface and the portion of the second electrode layer disposed on the end surface has a flat surface.

8. The capacitor of claim 1, wherein the metal of the second electrode layer is the same material as the first electrode layer.

9. The capacitor of claim 1, wherein $Lt/500 \leq Ta \leq Lt/50$, where $Lt$ is a length of the capacitor body and $Ta$ is a thickness of the second electrode layer covering the upper and lower surfaces of the capacitor body.

10. The capacitor of claim 1, wherein $Lt/250 \leq Tb \leq Lt/25$, where $Lt$ is a length of the capacitor body and $Tb$ is a thickness of the first electrode layer covering the end surfaces of the capacitor body.

11. The capacitor of claim 1, wherein the third electrode layer is a plating layer formed of Ni and Sn.

12. A multilayer ceramic capacitor, comprising:
a body including a plurality of dielectric layers and internal electrodes which are alternately stacked, the body having upper and lower surfaces, end surfaces, and side surfaces, and
an external electrode including a first electrode layer, a second electrode layer, and a third electrode layer,
wherein the second electrode layer includes a resin and a metal,
the second layer is interposed between the first layer and the third layer,
a thickness of portions of the second layer covering the end surfaces is smaller than a thickness of portions of the second layer covering the upper and lower surfaces,
a thickness of portions of the first layer covering the end surfaces is greater than a thickness of the portions of the second layer covering the upper and lower surfaces,
an entirety of the first electrode layer directly contacts corresponding surfaces of the capacitor body, and
a portion of the first electrode layer covering one of the side surfaces of the capacitor body directly contacts the third electrode layer covering a corresponding side surface.

13. The multilayer ceramic capacitor of claim 12, wherein the first layer contacts the third layer.

* * * * *